3,053,612
PROTECTION OF CATALYSTS IN THE CONVERSION OF LEAD-CONTAMINATED WASTE PRODUCTS
Armand J. de Rosset, Clarendon Hills, Ill., assignor to Universal Oil Products Company, Des Plaines, Ill., a corporation of Delaware
No Drawing. Filed Feb. 29, 1960, Ser. No. 11,460
14 Claims. (Cl. 23—2)

The present invention relates broadly to a method of improving lead-containing waste products for discharge into the atmosphere and, more specifically, is directed to the conversion of a lead-contaminated, hydrocarbon-containing combustible mixture.

The desirability and importance of removing certain components from automobile exhaust gases has recently been recognized. The unavoidably incomplete combustion of hydrocarbon fuels by the gasoline or diesel engine results in the generation of substantial quantities of unburned hydrocarbons, and other undesirable products, which discharge into the atmosphere through the exhaust line. With the ever-increasing concentration of automobiles, particularly in urban areas, the discharge of waste products into the atmosphere may reach significantly deleterious proportions. These combustion products are believed to react with atmospheric oxygen, under the influence of sunlight, to produce what is now commonly referred to as smog. The undesirable hydrocarbonaceous products include, for example, unsaturated hydrocarbons, partially oxidized hydrocarbons such as alcohols, ketones, aldehydes and acids, carbon monoxide, and various oxides of nitrogen and sulfur. Although at least a portion of these compounds may be partially removed by chemical sorption media, the destructive conversion of the exhaust gas constituents by catalytic means is by far the preferred technique. The desired objective is to achieve substantially complete conversion of all of the unburned hydrocarbons, particularly the high molecular weight unsaturated hydrocarbons, and carbon monoxide, as well as the partially-oxidized hydrocarbons hereinabove set forth, into carbon dioxide and water, prior to discharging the exhaust gases into the atmosphere. The discharge of exhaust gases from automotive internal combustion engines is one source of atmospheric pollution. Although described with particular reference to the conversion of such exhaust gases, the present invention is equally well adaptable to utilization with diesel engines, butane engines, natural gas engines, and the like. Other exemplary applications of the invention involve the conversion of the exhaust gases emanating from stationary units such as large internal combustion engines for driving pumps, compressors, generators, as well as flue gases issuing from waste-heat boilers, flue gas power recovery units, and the like.

Catalytic means for improving waste products for discharge into the atmosphere, and particularly for the conversion of the hydrocarbonaceous combustion products contained within the exhaust gases emanating from an internal combustion engine, requires the utilization of a catalyst possessing an exceptionally high degree of activity, and particularly a high stability, or capability of performing its intended function for an extended period of time. The catalyst to be employed may be conveniently placed in a suitable container, or catalytic converter, and installed within the exhaust line. The catalytic converter may be of the through-flow, cross-flow, or radial-flow design, and, in the case of automotive exhaust gases, may supplant or be combined with the usual acoustic muffler. In the majority of exhaust gas conversion systems, secondary or combustion air is injected upstream of the catalytic conversion zone, usually by means of an aspirator or by external compressor means.

A wide variety of factors affect the stability of active catalytic composites, which factors are generally peculiar to the environment in which the catalyst is employed. In regard to catalysts for the conversion of the hydrocarbonaceous combustion products emanating from an internal combustion engine, the actual operation of the engine must be considered. For example, such engine is commonly operated over a wide range of speed and load conditions, and, therefore, the combustion efficiency thereof correspondingly varies; the space velocity and temperature of the exhaust gases, as well as the concentration of combustible material therein, likewise varies over wide limits. The catalyst should be capable of withstanding high temperatures of the order of 1600° F. to as high as 2000° F. without rapid deactivation, and preferably should possess maximum activity at substantially lower temperatures. The catalyst should have a relatively low threshold-activation temperature in order that the conversion reactions are self-initiating within a minimum time following startup from relatively cold conditions. In general, it is desirable that the catalyst be satisfactorily active at temperatures in the range of from 200° F. to about 2000° F.

Although a great many potentially good, high activity catalysts have been developed which would presumably perform well even under such adverse conditions, these catalysts are not practically suited to the task of converting gases which contain lead and lead compounds since such catalysts are, in general, highly susceptible to lead poisoning within a few thousand road miles of operation. Since virtually all motor fuel compositions contain tetraethyl lead or equivalent lead compounds in order to improve their anti-knock characteristics, the impracticability of any widespread use of these catalysts becomes at once apparent; catalysts so affected must be replaced frequently or subjected to elaborate regeneration techniques, neither of which procedures is economically attractive.

The present invention provides a method of utilizing high activity, lead-sensitive catalysts in the conversion of lead-containing exhaust gases while greatly prolonging the catalyst life and otherwise increasing catalyst stability, which method comprises contacting said gases with a contact mass of a lead compound-reducing component, e.g., a material capable of reducing relatively volatile lead compounds into a non-volatile form, for example, into metallic lead, which is thereupon deposited upon the contact mass of lead compound-reducing component, and thereafter passing the gases, the lead content of which has been substantially decreased, into contact wtih the conversion catalyst under conversion conditions.

In a broad embodiment, the present invention relates to a method for improving lead compound-contaminated waste products for discharge into the atmosphere which comprises first passing said waste products into contact with a lead compound-reducing component and thereafter reacting the waste products in contact with a catalyst.

Another embodiment of the present invention is directed to a method for the conversion of a lead compound-contaminated, hydrocarbon-containing combustible mixture which comprises first passing said combustible mixture into contact with a lead compound-reducing component comprising a metal above lead in the Electromotive Series, and thereafter reacting said combustible mixture at conversion conditions in contact with a conversion catalyst.

A more specific embodiment of the instant invention concerns a method for the conversion of the hydrocarbonaceous exhaust gases emanating from an internal combustion engine which comprises first passing said exhaust gases into contact with a lead compound-reducing component comprising a mechanical mixture of a metal above lead in the electromotive series and an alkaline constituent selected from the group consisting of the alkali metal carbonates, and the oxides, carbonates and hydroxides of the alkaline earth metals, then admixing said exhaust gases with air, and thereafter reacting the resulting mixture, at a temperature within the range of about 200° F. to about 2000° F., in contact with a conversion catalyst.

As hereinbefore set forth, the majority of motor fuels, including some diesel fuels and fuels for marine engines, contain tetraethyl lead as an additive for increasing the anti-knock efficiency of the engine in which the fuel is consumed. Under the conditions experienced during the combustion of the motor fuel, the lead, either as tetraethyl lead, or in modified form such as the halides, oxides, and oxyhalides of lead, is carried out with other exhaust gases through the exhaust line. Catalytic composites, otherwise highly active and stable in regard to hydrocarbon conversion, are deleteriously affected by the detrimental deposition of lead compounds thereon. From a theoretical standpoint, it appears lead poisoning occurs via two mechanisms; the first, which is the more rapid poisoning, occurs upon the physical and chemical contamination of a catalytically active constituent by very minor quantities of lead; the second, a much slower poisoning, appears to occur through the plugging of the pores of the catalyst by lead compounds. It may also be that the slower poisoning actually produces a mono-molecular film of a lead compound over the entire micro-structure of the catalyst. These theoretical considerations are not to be considered as limiting upon the broad scope of the present invention, as the actual mechanism by which the poisoning occurs is not essential to the method herein.

According to the instant invention, the lead-deactivation of the catalyst is greatly retarded, and the catalyst life therefore substantially prolonged, by effecting the treatment of the exhaust gases in two serially connected zones, the first or upstream zone containing a contact mass of a lead compound-reducing component and the second or downstream zone containing the conversion catalyst proper; when, as is most common, the conversion involves the destructive oxidation of hydrocarbons and carbon monoxide, secondary or combustion air is introduced into the exhaust gas stream intermediate the two zones. The lead compound-reducing component thus serves as a guard medium or external lead sink for the conversion catalyst.

The method of the present invention and the benefits afforded through the utilization thereof will be more clearly understood by defining several of the terms employed within the specification and the appended claims. The term "conversion catalyst" is intended to connote an element, compound, composite of two or more elements or compounds, or mechanical mixture of composites which are employed for their catalytic activity in regard to the conversion of hydrocarbons and/or carbon monoxide. The term "lead compound-reducing component" refers to a contact mass of a material capable of reducing lead, as it exists in higher valence states, and correspondingly in a volatile form to lower valence states, and preferably to metallic lead, whereby such lead is converted to a relatively non-volatile form at temperatures commonly encountered in exhaust gas streams and is thereupon deposited upon the lead compound-reducing component and not upon the conversion catalyst itself.

Suitable conversion catalysts contemplated for use in this invention comprise one or more catalytically active metallic components which are preferably, but not necessarily, composited with a refractory inorganic oxide carrier material. Typical catalytically active metallic components include, but are not limited to, vanadium, chromium, molybdenum, tungsten, members of the iron-group and platinum-group of the periodic table, copper, silver, and gold. A particular metal may be used singly or in combination with any of the foregoing metals. Thus, the catalyst of the present invention may comprise metals selected from groups IB, VA, VIA and VIII of the periodic table. Especially desirable catalytically active metals or combinations thereof comprise the following: platinum, palladium, other noble metals such as iridium and rhodium, iron, cobalt, nickel, chromium, copper, vanadium, tungsten, molybdenum, manganese, silver, gold, and various mixtures including copper-cobalt, copper-iron, copper-chromium, nickel-chromium, cobalt-chromium, manganese-chromium, manganese-iron, platinum-iron, platinum-cobalt, platinum-nickel, palladium-iron, palladium-cobalt, palladium-nickel, palladium-platinum, palladium-copper-cobalt, platinum-copper-cobalt, copper-cobalt-nickel-palladium, platinum-palladium-cobalt, etc.

It is preferred that the catalytically active metallic component be composited with a refractory inorganic oxide, the latter serving as a carrier material therefor. Although it is preferred that the refractory inorganic oxide contain at least a portion of alumina, other suitable refractory inorganic oxides include silica, boria, titania, zirconia, hafnia, and mixtures of two or more. The carrier material may be manufactured by any suitable method including separate, successive, or co-precipitation methods of manufacture. The carrier material may comprise naturally occurring substances such as clays or earths, and may or may not be activated prior to use by one or more treatments including drying, calcining, steaming, or particular treatments with various inorganic and organic reagents. Regardless of the particular method of manufacturing the refractory inorganic oxide material, it appears that highly beneficial results are obtained through the use of a refractory inorganic oxide having an apparent bulk density within the range of about 0.15 to about 0.40 gram/cubic centimeters.

It is understood that the catalytic activity, thermal stability, auto-initiating temperature, and other characteristics of the conversion catalyst hereinabove set forth are not necessarily equivalent. Many of the specific catalytic composites discussed herein do not necessarily yield equivalent results when compared with a catalyst comprising two or more different metallic components. It is further understood that the method of the present invention is not to be limited to the utilization of any of the above-enumerated conversion catalysts, since the essential invention herein resides in the removal of deleterious lead compounds from the waste products stream prior to contact with the conversion catalyst.

The lead compound-reducing component is preferably disposed in a separate zone upstream from the zone containing the conversion catalyst. In one embodiment of the invention, the lead compound-reducing component comprises a metal which lies above lead in the electromotive series, specifically tin, nickel, cobalt, cadmium, iron, manganese, chromium, zinc, aluminum, magnesium, calcium, sodium, potassium, and lithium, among which the preferred metals are nickel, cobalt, cadmium, iron, manganese, chromium, zinc, aluminum and magnesium. The term "metal" as used herein designates a free metal or metallic constituent existing in the zero valence state, as distinguished from metal oxides and other metallic compounds. The metal may be employed singly or in combination with one or more other metals, either as a mechanical mixture or as an alloy; thus, various types of stainless steel may also be utilized. The metal may be mechanically arranged in any suitable manner, such as a fine mesh screen or a plurality of such screens spaced along the flow path of the exhaust gases, or as a fibrous mass of metal wool, or simply coated or plated upon inert refractory rods, perforated plates, baffles, etc. Alternatively, the metal may be powdered or otherwise finely divided and composited, as by copilling or extruding, with a refractory inorganic oxide such as alumina, silica, silica-alumina, magnesia, silica-magnesia, etc., which serves as an extender for increasing the porosity of the contact mass; in the latter preparation, the lead compound-reducing component exists in the form of a fixed particle-form bed, the particles having any desired shape such as spheres, pills, pellets and the like.

The metal lead compound-reducing component functions as a guard medium in the following manner. A typical commercial tetraethyl lead additive contains, in addition, approximately 1 mol of chlorine and ½ mol of bromine, usually as ethylene dihalide, per mol of lead, which serves as a scavenging agent to prevent build-up of lead deposits on spark plugs and engine cylinder walls. That portion of the lead tetraethyl which is decomposed during combustion is thereby preferentially converted to highly volatile lead halides, e.g., to $PbCl_2$ and $PbBr_2$, with minor amounts being converted to oxyhalides and oxides, which discharge into the exhaust line along with unconverted hydrocarbons and carbon monoxide. Prior to introduction of secondary air, such gases comprise a reducing atmosphere. When these lead-containing gases flow into contact with the lead compound-reducing agent, the lead is reduced to metallic lead or to lead oxide as indicated by the following characteristic equations:

(1) $\quad\quad M+PbX_2 \rightarrow Pb+MX_2$
(2) $\quad\quad M+PbOX_2 \rightarrow PbO+MX_2$
(3) $\quad\quad PbO+M \rightarrow Pb+MO$ where M is a free metal above lead in the electromotive series and may, of course, have multivalent halides and oxides other than the divalent state illustrated above, and X is a halogen. Analogous reactions occur where the "X" substituent is an organic radical as in the case of undecomposed lead tetraethyl.

In an anhydrous reducing atmosphere, the lead-reducing metal effectively strips out lead from the exhaust gas stream and prevents or substantially retards deposition of lead upon the conversion catalyst. However, in a wet reducing atmosphere, that is, when water, steam, or superheated steam is present, and where the resultant metal oxide MO is acidic, the foregoing mechanism may, in some instances, be complicated by the hydrolysis of the metal halide to liberate hydrogen halide according to the typical reaction:

(4) $\quad\quad MX_2+H_2O \rightarrow MO+2HX$

The resulting free hydrogen halide, for example HCl, exerts two adverse effects on the lead-retaining ability of the guard medium: first, it will assist in the downstream migration of lead as the volatile chloride; second, it will catalyze the surface oxidation of the metal by water throughout the guard bed so that no free metal is available to contact the lead halide vapors.

Hence, in a wet reducing atmosphere, which is most often characteristic of exhaust gases emanating from an internal combustion engine, the lead-reducing metal is preferably selected such that it not only is above lead in the electromotive series but also forms a neutral or basic oxide, so that Reaction 4, supra, is forced to the left. Metals which fill both requirements include chromium, manganese, iron, cobalt and nickel.

The detrimental hydrolysis of metal halide may also be overcome by another embodiment of the present invention which provides an intimate mechanical mixture of (1) a metal above lead in the electromotive series and (2) an alkaline constituent which may be an alkali metal carbonate or an oxide, carbonate or hydroxide of an alkaline earth metal. Such alkaline constituents thus include the carbonates of lithium, sodium, potassium, rubidium and cesium; and the oxides, carbonates and hydroxides of calcium, strontium and barium; and mixtures of two or more of the above. The alkali metal oxides and hydroxides are excluded from this list because they would chemically attack the lead-reducing metal composited therewith. The function of the alkaline constituent is to absorb the hydrogen halide evolved by the reaction of water and metal halide which, in turn, is formed by the reduction of the lead halide vapor. Thus, any metal above lead in the electromotive series, even though it forms an acidic metal oxide, may be successively utilized in a wet reducing atmosphere for the removal of volatile lead compounds, when it is composited with such alkaline constituent. In this embodiment, the lead compound-reducing component comprises a powdered, ground or otherwise finely divided free metal of the designated class in physical admixture with one or more of the above-enumerated alkaline constituents, and preferably also contains a refractory inorganic oxide such as alumina, silica, silica-alumina, magnesia, silica-magnesia, etc. as a filler or extender for increasing the porosity and therefore, the lead-retaining capacity of the contact mass. The composite should be formulated to contain from about 1 to about 5 mols of alkaline constituent per mol of free metal, although greater amounts of alkaline constituent may be employed when desired since the alkaline constituent has by itself a significant ability to absorb lead compounds. When the composite also contains a refractory filler, such filler e.g., alumina, silica, etc., is present in amounts of from about 10% to about 85% by weight of the total contact mass, and preferably in amounts of from 10% to 50% by weight thereof. The lead compound-reducing component is preferably disposed in the form of a fixed, particle-form bed, the particles having any desired shapes such as spheres, pills, extrudates, powder, granules, cakes, etc. Calcium oxide is particularly desirable as an alkaline constituent since its cementing action advantageously permits formation of granules by extrusion of wet, paste-like composites thereof.

Exemplary methods of preparing the lead compound-reducing component are as follows: 9 weight parts of sodium bicarbonate may be ground and mixed with 1 part of aluminum powder and 4 parts of alumina containing 20% by weight of water, plus a small amount of graphite lubricant, and the mixture then tableted in a pilling machine, the resulting pills then being calcined in a reducing atmosphere at a temperature of about 590° C. to yield aluminum-sodium carbonate-alumina particles; 2 weight parts of calcium oxide may be ground and mixed with one part of powdered iron and 3 parts of an alumina hydrogel and the resulting mixture formed into a paste with water and extruded, the extrudate being calcined in a reducing atmosphere at a temperature of about 590° C. to yield an iron-calcium oxide-alumina composite; 4 weight parts of calcium carbonate may be ground and mixed with 1 part of powdered iron and 2 parts of silica, plus a small amount of graphite lubricant, and the mixture then extruded to yield an iron-calcium carbonate-silica composite; 10 weight parts of barium hydroxide may be ground and mixed with 1 part of magnesium powder and 6 parts of high-surface silica-alumina cracking catalyst, containing about 88% silica by weight, plus a small amount of graphite lubricant, and the mixture then formed into pills by means of a pelleting machine to yield a magnesium-barium hydroxide-silica-alumina composite.

The following examples are given for the purpose of further illustrating the method of the present invention, and to indicate the benefits afforded through the utilization thereof. It is not intended that the present invention be limited to the reagents, concentrations and/or conditions employed within the examples.

EXAMPLE I

Lead chloride was vaporized in a stream of anhydrous nitrogen, at a flow rate of 0.12 standard cubic feet per hour and a temperature of 550° C., and passed through a mass of aluminum turnings disposed in a 5 millimeter I.D., Pyrex glass U-tube, in a total amount to 650 milligrams. The aluminum contact mass was divided into three separate zones by glass-fiber filter discs, and maintained at a temperature of about 590° C. The lead chloride was passed through the contact mass of aluminum at a GHSV (gas hourly spaced velocity) of 1500 for a total period of 16 hours during which time about 25 milligrams of lead was charged to the U-tube. Upon termination of the 16-hour period, the U-tube was cooled to room temperature and the inlet, center and outlet sections of the aluminum contact mass were removed from the U-tube and analyzed for lead retention by means of an emission spectograph.

EXAMPLE II

The experiment of Example I was repeated except that the nitrogen carrier gas was saturated with water at 550° C. before being passed into contact with the aluminum.

The results of Examples I and II are shown in Table I below:

Table I

| $PbCl_2+N_2$ Carrier | Lead Concentration in Metal Mass, Wt. Percent | | |
|---|---|---|---|
| | Inlet | Center | Outlet |
| (I) Dry | 6.6 | 1.3 | 0.5 |
| (II) Wet | 2 | 2.4 | 1.8 |

The lead-reducing and depositing propensities of aluminum in a dry non-oxidizing atmosphere are readily borne out from the data of Table I. About 13 times the amount of lead was deposited in the inlet portion of the aluminum contact mass as in the outlet portion thereof; and, in fact, about 50% by weight of the total lead charged was retained in the initial 10% of the contact mass. The existence of such lead concentration gradient demonstrates that aluminum metal preferentially reduces and retains lead and therefore constitutes an excellent catalyst bed medium in accordance with the present invention.

However, when aluminum is employed in a wet atmosphere, it makes a rather poor lead compound-reducing component, also as shown by Table I (line II) wherein the lead was fairly uniformly distributed throughout the contact mass. When water is present, even as a superheated vapor, metals such as aluminum which form an acid oxide cannot be successively utilized alone.

EXAMPLE III

The experiment of Example II is repeated, using a wet nitrogen carrier for the lead chloride, except that a number of other metals, specifically chromium, manganese, iron, cobalt and nickel, which form neutral or basic oxides, are employed in the form of fine wool-like turnings. The results are shown in Table II below:

Table II

| Metal | Lead Concentration in Metal Mass, Wt. Percent | | |
|---|---|---|---|
| | Inlet | Center | Outlet |
| Cr | 5.5 | 1.1 | 0.7 |
| Mn | 6.2 | 1.3 | 0.6 |
| Fe | 4.8 | 1.2 | 0.6 |
| Co | 7.2 | 1.8 | 0.5 |
| Ni | 5.1 | 1.4 | 0.9 |

As shown in Table II, those metals which do not form acid oxides will function satisfactorily in the reduction of lead halides and preferential removal of lead, even in the presence of water.

EXAMPLE IV

The lead compound-reducing components are further evaluated by means of a particular test designed to simulate actual driving conditions. The test procedure involves the utilization of a standard dynamometer, whereby an 8-cylinder gasoline engine is loaded by a motor-generator. Two parallel-connected, vertically oriented cylindrical vessels or converters, having an inside diameter of 3.826", are serially connected into the engine exhaust line so that the gas enters the top of the converter and flows downwardly therethrough. A suitable reference conversion catalyst is loaded into one of the converters in a bed depth of about 6", the bed being disposed upon a supporting screen therein. A second screen is arranged above the catalyst bed and a layer of ¼" ceramic balls is placed therein to facilitate the even distribution of the exhaust gases flowing downwardly through the bed. The second converter is loaded both with the same reference conversion catalyst and with a separate layer of lead compound-reducing component particles upstream therefrom; the lower catalyst bed is 3" deep and the upper guard bed is also 3" deep. Flow control means are provided to equalize exhaust gas flows through the two converters. Secondary or combustion air is pressured into the inlet of the converter containing only conversion catalyst and into the intermediate portion of the two-bed converter downstream from the guard bed but upstream from the catalyst bed, and its flow rate adjusted such that the average temperature of the catalyst beds is maintained within the range of about 800° F. to about 1600° F. In order to minimize random deviations in the test procedure, it is preferred that the combustion air flow rate be held constant at about 6 pounds/hour such that the catalyst bed temperatures are maintained at a level of about 900° F. The fuel employed during the test run is a commercial premium-grade gasoline containing 3.0 milliliters of tetraethyl lead per gallon. Since the concentration of unburned hydrocarbons and other waste products in the exhaust gases as well as the throughput thereof, varies with the operational status of the engine, that is, whether idling, accelerating, cruising, or decelerating, the test procedure is facilitated by operating the engine at constant speed and load throughout the entire test period, specifically, 2500 r.p.m. at 41 brake horsepower. Samples of the inlet and outlet gases of each converter are taken at approximately four hour intervals during the test run. These samples are analyzed for hydrocarbon content by a Liston-Becker infrared gas analyzer employing a hexane cell detector. In reporting the results of the analyses performed on the effluent of the converters, the term "hydrocarbon" connotes all hydrocarbons whether saturated, unsaturated, or partially-oxidized as hereinbefore set forth. The internal combustion engine is operated for a total period of 60 hours, during which time about 450 pounds of premium-grade fuel are consumed; provisions are made whereby the fuel is consumed at a constant rate of about 7.5 pounds/hour. The data thus obtained is plotted on semi-logarithmic coordinates, with percent conversion on the ordinate verses time on the abscissa, and results in a linear deactivation curve in which the following equation is derived:

$$c = ae^{-t/k}$$

where, $k = 1$ divided by the slope,
$a =$ percent initial conversion (extrapolated),
$c =$ percent conversion at time $(t)$, and
$t =$ time in hours.

The above equation is employed in computing the "$k$" values for the reference catalyst and for the guard-catalyst combination. A decrease in the slope of the curve, or conversely an increase in "$k$" value, indicates a catalyst possessing a greater degree of stability when converting the hydrocarbonaceous combustion products contained in the exhaust gases of an internal combustion engine.

A number of lead compound-reducing components are evaluated as catalyst guard media according to the foregoing procedure wherein the conversion catalyst is a platinum-alumina composite containing 0.375% platinum by weight. These components are designated as composites A, B, C and D which are prepared as hereinabove set forth and wherein the percentages given are by weight of total composite.

Composite A—10% aluminum, 50% sodium carbonate, 40% alumina, co-pilled, 1/16" pills.
Composite B—20% iron, 60% calcium oxide, 20% silica, extruded, 1/8" x 1/4" cylinders.
Composite C—14% iron, 57% calcium carbonate, 29% silica, extruded, 1/8" x 1/4" cylinders.
Composite D—6% magnesium, 60% barium hydroxide, 34% silica-alumina (88% silica), co-pilled, 1/16" pills.

The following Table III indicates the "k" values and stability-slope values determined from the curves drawn on the semi-logarithmic coordinates as previously described.

Table III
STABILITY EVALUATION

| Composite: | "k" |
|---|---|
| Platinum-alumina alone | 23 |
| Composite "A" plus ½ bed of platinum-alumina | 41 |
| Composite "B" plus ½ bed of platinum-alumina | 42 |
| Composite "C" plus ½ bed of platinum-alumina | 37 |
| Composite "D" plus ½ bed of platinum-alumina | 33 |

The data of Table III clearly illustrate the benefits to be afforded through the utilization of the present invention. As a result of employing metal-alkaline constituent guard beds upstream from the conversion zone, the stability slope of the conversion catalyst is increased as much as 180%. The improved stability is especially remarkable in view of the fact that the dual bed converters contain only ½ the quantity of conversion catalyst as the single bed converter but yet are exposed to the same total amount of exhaust gas. Thus, by removing substantial quantities of lead compounds from the exhaust gas prior to its contact with the conversion catalyst, the deactivation rate of the catalyst is substantially reduced and useful catalyst life greatly prolonged.

From a practical standpoint, the dual bed conversion system is especially advantageous in that the lead compound-reducing component may be disposed in a removal tube or cartridge fitted into the exhaust line, which can be readily replaced with a "plug-end" type of unit from time to time as the guard material becomes saturated with lead. At the same time, lesser quantities of the more expensive conversion catalyst are required and such catalysts may be utilized in place for much longer periods of time, without need for frequent replacement or regeneration.

I claim as my invention:

1. A method for eliminating products of incomplete combustion from internal combustion engine exhaust gases containing reducible lead compound, which comprises first passing said gases through a mixture of free metal above lead in the electromotive series and an alkaline constituent selected from the group consisting of the alkali metal carbonates and the oxides, carbonates and hydroxides of the alkaline earth metals to remove lead compound from the gases, and thereafter contacting the exhaust gases of diminished lead content, in admixture with air, with a lead-sensitive oxidation catalyst at an oxidizing temperature.

2. The method of claim 1 further characterized in that said free metal forms a basic oxide.

3. The method of claim 1 further characterized in that said alkaline constituent comprises sodium carbonate.

4. The method of claim 1 further characterized in that said alkaline constituent comprises calcium carbonate.

5. The method of claim 1 further characterized in that said alkaline constituent comprises calcium oxide.

6. The method of claim 1 further characterized in that said free metal comprises aluminum.

7. The method of claim 1 further characterized in that said free metal comprises iron.

8. The method of claim 1 further characterized in that said alkaline constituent comprises a composite of sodium carbonate and alumina.

9. The method of claim 1 further characterized in that said alkaline constituent comprises a composite of calcium carbonate and silica.

10. A method for eliminating products of incomplete combustion from the hydrocarbonaceous exhaust gases emanating from an internal combustion engine and containing reducible lead compound, which comprises first passing said exhaust gases into contact with a mechanical mixture of a free metal above lead in the electromotive series and an alkaline constituent selected from the group consisting of the alkali metal carbonates and the oxides, carbonates and hydroxides of the alkaline earth metals, whereby to deposit lead in said mixture, then admixing said exhaust gases of reduced lead content with air, and thereafter contacting the resulting mixture at a temperature within the range of about 200° F. to about 2000° F. with a lead-sensitive oxidation catalyst.

11. The method of claim 10 further characterized in that said free metal comprises finely-divided aluminum.

12. The method of claim 10 further characterized in that said free metal comprises finely-divided iron.

13. The method of claim 10 further characterized in that said mechanical mixture comprises alumina.

14. The method of claim 10 further characterized in that said mechanical mixture comprises silica.

References Cited in the file of this patent
UNITED STATES PATENTS

| 1,716,479 | Bilsky | June 11, 1929 |
| 1,716,481 | Bilsky | June 11, 1929 |

OTHER REFERENCES

Mellor: "A Comprehensive Treatise on Inorganic and Theoretical Chemistry," Longmans, Green and Co., N.Y., vol. 7, 1927, page 718.